Patented Nov. 1, 1932

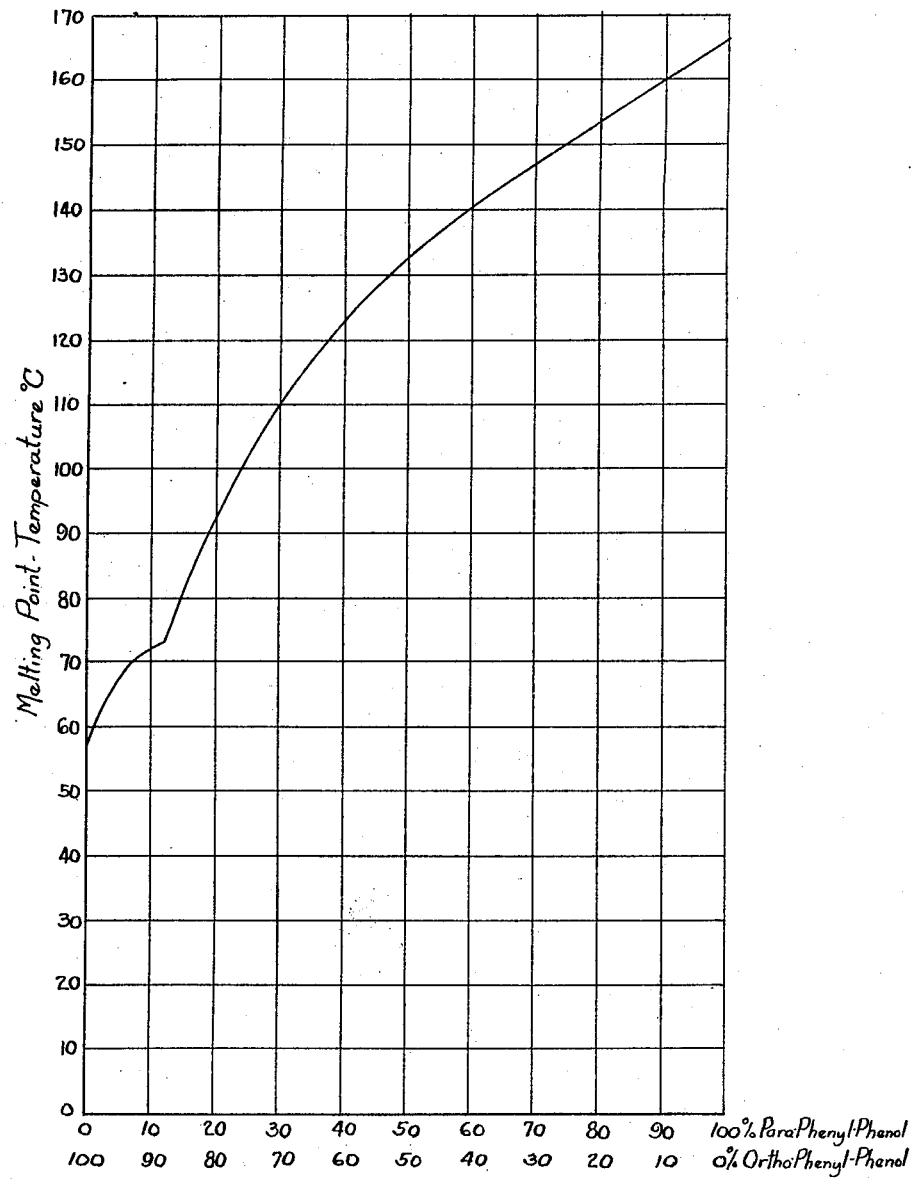

1,885,176

UNITED STATES PATENT OFFICE

EDGAR C. BRITTON AND FRED BRYNER, OF MIDLAND, MICHIGAN, ASSIGNORS TO THE DOW CHEMICAL COMPANY, OF MIDLAND, MICHIGAN, A CORPORATION OF MICHIGAN

METHOD FOR SEPARATING PHENYLPHENOLS

Application filed December 5, 1929. Serial No. 411,761.

The present invention relates to the separation of phenylphenols, particularly to a method for the separation of ortho- and para-phenylphenols involving precipitation of a relatively insoluble alkaline earth metal salt of the para-compound from an aqueous solution containing soluble salts of both such phenylphenols.

We have found that ortho- and para-phenylphenols, due to inherent differences in solubility of their salts, can conveniently be separated by precipitation of the less soluble salt of the para-compound, for instance, by treating an aqueous solution of the soluble salts of said phenylphenols with a solution of an alkaline earth metal salt, e. g. calcium chloride. Our invention, then, consists of the method hereinafter fully described and particularly pointed out in the claims, the annexed drawing and the following description setting forth in detail several modes whereby the principle of our invention may be employed.

In said annexed drawing:—

Fig. I is a chart giving a curve which shows the relationship between percentage composition of mixtures of ortho- and para-phenylphenols to the melting points thereof.

A mixture of ortho- and para-phenylphenols may be separated into its components by dissolving same in aqueous sodium hydroxide, or other alkali metal hydroxide solution, preferably using an excess of base to prevent hydrolysis of the metal phenates formed, warming the solution, and then treating at the elevated temperature with a solution of calcium chloride or other soluble alkaline earth metal salt, to precipitate para-phenylphenol as a substantially insoluble alkaline earth compound, e. g. calcium di-para-phenylphenate, basic calcium para-phenylphenate, or mixture thereof. (The normal calcium salt is a white solid, relatively insoluble in water and the usual inert organic solvents, decomposed by hydrochloric or equivalent acid to form the free phenol, and is soluble in, for example, an aqueous solution of sodium carbonate and hydroxide to form the corresponding sodium salt of the phenol). The precipitate is separated from the solution by filtration therefrom, and the filtrate acidified to precipitate ortho-phenylphenol which may then be recovered in any suitable manner. The precipitated para-phenylphenol compound may be converted by warming with hydrochloric acid into the free para-phenylphenol, the latter remaining as a solid which may be separated from the solution in any desired manner. Another procedure to recover the para compound involves boiling the precipitated calcium or equivalent compound with an aqueous solution of sodium carbonate and sodium hydroxide, filtering off precipitated calcium carbonate, and acidifying the liquor whereby para-phenylphenol is precipitated, which latter may then be separated in any convenient way.

Our herein described method may be applied to the separation of ortho- and para-phenylphenols from a mixture containing phenylphenols, e. g. from an aqueous phenate liquor phenol, e. g. from an aqueous phenate liquor obtained in the preparation of phenol by the hydrolysis of chlorobenzene, said aqueous liquor containing for instance, sodium hydroxide, and the sodium salts of phenol and ortho- and para-phenylphenols. The aqueous phenate liquor may be treated with hydrochloric acid to neutralize excess sodium hydroxide and then with a solution of calcium chloride sufficient to precipitate para-phenylphenol as a relatively insoluble calcium compound, which latter is then separated from the residual solution by any suitable means and worked to obtain the free para compound as above described. Said residual solution is treated with acid till it is barely alkaline to litmus indicator, and then separated from precipitated ortho-phenylphenol. The filtrate from the latter, which contains sodium phenate, may then be acidified to liberate free phenol of good quality.

The following examples illustrate various ways in which our invention may be utilized. The composition of the crude ortho- and para-phenylphenols and mixtures thereof given in the examples may be determined by comparing the melting point thereof with the melting point curve shown in Fig. 1. The melting points of substantially pure orthoand para-phenylphenols are about 57° C. and 166-7° C. respectively.

Example 1

A mixture containing 6 and 4 grams, respectively, of ortho- and para-phenylphenol (m. p. 123° C.) was dissolved in 20 cc. water containing 2.36 grams sodium hydroxide, i. e. the theoretical amount of the latter required to convert the phenols into sodium salts, by heating to about 90° C. To the so obtained solution was added 2.61 grams calcium chloride in 150 cc. water. After cooling the reaction mixture to about 25° C., the precipitated calcium compound was filtered from the liquid, washed with water, and treated with hydrochloric acid to form free para-phenylphenol, the latter being filtered from liquid and washed free from chlorine-containing compounds. Thus 3.9 grams of crude para-phenylphenol were obtained having a melting point of 163.5° C., being therefore equivalent to a recovery of 97.5 per cent. The filtrate from the calcium precipitate was acidified to precipitate crude ortho-phenylphenol which was separated by filtration from the solution and washed, being obtained in a 5.75 gram (m. p. 67-70° C.) or 95.8 per cent yield.

Example 2

To a hot solution containing 137 grams phenol, and 14.5 and 9.7 grams, respectively, of ortho- and para-phenylphenol dissolved in 450 cc. of water containing 66 grams, or a 28 per cent. excess of sodium hydroxide over that required to form the sodium salts of the phenols therein, was added 6.4 grams calcium chloride. The reaction mixture was then cooled to about 20° C., filtered from precipitated calcium compound, the latter then being treated with hydrochloric acid, thereby liberating 7.9 grams para-phenylphenol of m. p. 164° C., i. e. a recovery of 81.5 per cent. By diluting the filtrate to approximately 1200 cc., a mixture of ortho- and para-phenylphenols separated, which after separation from the liquid and treatment with acid yielded 8.1 grams of the mixed phenylphenols, melting at 95-103° C. The liquid was then made just alkaline to litmus by adding hydrochloric acid, whereby 6.1 grams of crude ortho-compound (m. p. 85° C.) separated. Hence the total ortho- and para-phenylphenols were recovered in a 91.3 per cent. yield.

Free phenol was obtained from the filtrate from the ortho-compound by acidification.

Example 3

A 100 gram sample of crude mixed phenylphenols having a melting point of 123° C., and containing 45.5 and 39.5 per cent., respectively, of ortho- and para-phenylphenol, was dissolved in 150 cc. water containing 25.8 grams sodium hydroxide (10 per cent. excess). The aqueous solution was extracted twice with chlorobenzene to remove alkali-insoluble material such as diphenyl oxide, the temperature being maintained above 60° C. to prevent separation of sodium para-phenylphenate or any hydrolyzed material. The extracted aqueous liquor was then treated with hydrochloric acid until the excess caustic was neutralized, and then 25.8 grams calcium chloride was added thereto at about 95° C. After cooling the reaction mixture to substantially 20° C., the precipitate containing the para-phenylphenol in combined form was separated therefrom and dissolved in a solution of sodium carbonate and sodium hydroxide, the alkaline solution then being treated with a decolorizing carbon and filtered, while still hot, therefrom. The filtrate was acidified, cooled, and filtered from solid para-phenylphenol, 37 grams of the latter being obtained, having a melting point of 163.5° C. From the chlorobenzene extract was obtained an additional 0.2 gram, hence the recovered para compound of good color amounted to 94.2 per cent of the quantity of said compound present in the original phenolic mixture.

Crude ortho-phenylphenol was obtained from the filtrate from the calcium salt of the para compound by acidification thereof with hydrochloric acid.

Soluble barium and strontium salts, such as barium chloride, react with the phenylphenols in an analogous manner.

Intermediate fractions containing substantial amounts of both ortho- and para-phenylphenols may be returned to the process; accordingly the herein described method affords a commercial means for separating the aforementioned phenylphenols.

Other modes of applying the principle of our invention may be employed instead of those explained, change being made as regards the method herein disclosed, provided the step or steps stated by any of the following claims or the equivalent of such be employed.

We therefore particularly point out and distinctly claim as our invention:—

1. The method of separating ortho- and para-phenylphenols which comprises dissolving the same in an aqueous solution of an alkali metal hydroxide, precipitating a salt of para-phenylphenol therefrom by treatment with a soluble salt of an alkaline earth metal, and treating the precipitated salt to recover para-phenylphenol therefrom.

2. The method of separating ortho- and para-phenylphenols which comprises dissolving the same in an aqueous solution of an alkali metal hydroxide, precipitating a salt of para-phenylphenol therefrom by treatment with a chloride of an alkaline earth metal, and treating the precipitated salt to recover para-phenylphenol therefrom.

3. The method of separating ortho- and para-phenylphenols which comprises dissolving the same in an aqueous solution of sodium hydroxide, precipitating a salt of para-phenylphenol therefrom by treatment with calcium chloride, and treating the precipitated salt to recover para-phenylphenol therefrom.

4. The method of sepaarting ortho- and para-phenylphenols which comprises dissolving the same in an aqueous solution of an alkali metal hydroxide, precipitating a salt of para-phenylphenol therefrom by treatment with a soluble salt of an alkaline earth metal, reacting the precipitated salt with a solution of sodium carbonate and sodium hydroxide, whereby the para-phenylphenol goes into solution as a sodium salt, and precipitating para-phenylphenol therefrom by acidification.

5. The method of separating ortho- and para-phenylphenols which comprises dissolving the same in an aqueous solution of an alkali metal hydroxide, precipitating a salt of para-phenylphenol therefrom by treatment with a chloride of an alkaline earth metal, and reacting the precipitated salt with a solution of sodium carbonate and sodium hydroxide, whereby the para-phenylphenol goes into solution as a sodium salt, and precipitating para-phenylphenol therefrom by acidification.

6. The method of separating ortho- and para-phenylphenols which comprises dissolving the same in an aqueous solution of sodium hydroxide, precipitating a salt of para-phenylphenol therefrom by treatment with calcium chloride, and reacting the precipitated salt with a solution of sodium carbonate and sodium hydroxide, whereby the para-phenylphenol goes into solution as a sodium salt, and precipitating para-phenylphenol therefrom by acidification.

7. The method of separating ortho- and para-phenylphenols which comprises treating an aqueous solution containing soluble salts thereof with a soluble salt of an alkaline earth metal to precipitate the corresponding salt of the para-compound, separating the precipitate from the filtrate, treating the precipitate to recover para-phenylphenol therefrom, and acidifying the filtrate to liberate ortho-phenylphenol therefrom.

8. The method of separating ortho- and para-phenylphenols which comprises treating an aqueous solution containing soluble salts thereof with a soluble salt of an alkaline earth metal to precipitate the corresponding salt of the para-compound, separating the precipitate from the filtrate, reacting the precipitated salt with a solution of sodium carbonate and sodium hydroxide, whereby the para-phenylphenol goes into solution as a sodium salt, precipitating para-phenylphenol therefrom by acidification and liberating ortho-phenylphenol from said filtrate by acidification thereof.

9. The method of separating phenylphenols from phenol, which comprises treating an aqueous solution containing soluble salts thereof, with a soluble salt of an alkaline earth metal to precipitate a salt of para-phenylphenol, removing the latter, precipitating ortho-phenylphenol from the filtrate by adding a corresponding equivalent of acid thereto, and removing ortho-phenylphenol therefrom, phenol remaining in solution as sodium phenate.

10. The method of separating phenylphenols from phenol, which comprises treating an aqueous solution containing the sodium salts thereof, with calcium chloride to precipitate a salt of para-phenylphenol, removing the latter, and adding hydrochloric acid to the filtrate in amount equivalent to the ortho-phenylphenol present to precipitate the same, and removing the latter, phenol remaining in solution as sodium phenate.

11. The method of separating ortho- and para-phenylphenols from a mixture thereof containing alkali-insoluble matter, which comprises reacting such mixture with aqueous sodium hydroxide, extracting alkali-insoluble matter from the alkaline solution, neutralizing excess sodium hydroxide with acid, treating the neutralized aqueous liquor with a soluble salt of an alkaline earth metal to precipitate a salt of para-phenylphenol, and removing the latter salt.

12. The method of separating ortho- and para-phenylphenols from a mixture thereof containing alkali-insoluble matter and phenol, which comprises reacting such mixture with aqueous sodium hydroxide, extracting alkali-insoluble matter by chlorobenzene from the alkaline solution, neutralizing excess sodium hydroxide with hydrochloric acid, treating the neutralized aqueous liquor with sufficient calcium chloride to precipitate a calcium salt of para-phenylphenol, removing the latter salt, precipitating ortho-phenylphenol from the filtrate by adding a corresponding equivalent of hydrochloric acid thereto, and removing ortho-phenylphenol therefrom, phenol remaining in solution.

13. The method of separating ortho- and para-phenylphenols which comprises dissolving the same in an aqueous solution of an alkali-metal hydroxide, precipitating a salt of para-phenylphenol therefrom by treatment with a soluble salt of an alkaline-earth metal, and acidifying the precipitated salt with hydrochloric acid to liberate para-phenylphenol therefrom.

14. The method of separating ortho- and para-phenylphenol which comprises treating an aqueous solution containing water-soluble salts of said isomeric phenylphenols with a soluble salt of an alkaline earth metal to precipitate an alkaline earth metal salt of para-phenylphenol and leave ortho-phenylphenol dissolved in the form of a water-soluble salt thereof.

Signed by us this 26 day of November 1929.

EDGAR C. BRITTON.
FRED BRYNER.